United States Patent [19]

Schmahl

[11] 4,403,671
[45] Sep. 13, 1983

[54] FRONT AXLE BEARING BLOCK

[75] Inventor: Theo Schmahl, Bergisch Gladbach, Fed. Rep. of Germany

[73] Assignee: Klöckner-Humboldt-Deutz Aktiengesellschaft, Cologne, Fed. Rep. of Germany

[21] Appl. No.: 266,056

[22] Filed: May 21, 1981

Related U.S. Application Data

[63] Continuation of Ser. No. 54,701, Jul. 5, 1979, abandoned.

[30] Foreign Application Priority Data

Jul. 5, 1982 [DE] Fed. Rep. of Germany ....... 2829455

[51] Int. Cl.³ .................... B60G 7/00; B60K 17/28
[52] U.S. Cl. .................. 180/53 R; 180/233; 180/900; 280/111
[58] Field of Search ............ 180/233, 53.1, 53.7, 180/900; 280/111, 759, 771

[56] References Cited

U.S. PATENT DOCUMENTS

| | | | |
|---|---|---|---|
| 2,549,524 | 4/1971 | Rich | 280/111 X |
| 3,078,930 | 2/1963 | Foote | 180/53.1 |
| 3,483,938 | 12/1969 | Enters | 180/53.1 |
| 3,700,256 | 10/1972 | Jones | 280/111 X |
| 3,811,699 | 5/1974 | Casey | 280/111 |
| 4,124,079 | 11/1978 | Crow | 180/53.7 |

FOREIGN PATENT DOCUMENTS

| | | | |
|---|---|---|---|
| 2639690 | 3/1978 | Fed. Rep. of Germany | 180/53.7 |
| 2654420 | 8/1978 | Fed. Rep. of Germany | 180/53.7 |
| 732741 | 6/1955 | United Kingdom | 180/53.7 |

*Primary Examiner*—John A. Pekar
*Attorney, Agent, or Firm*—Becker & Becker, Inc.

[57] ABSTRACT

Front axle bearing block for the forward pendulum axle of a motor vehicle such as used in agriculture or construction industries, which bearing block is mountable on the frame of the vehicle, or in the case of a self-supporting construction of the vehicle body, is mountable on the internal combustion engine. The bearing block can serve as the support or carrying element for additional devices or machinery, for example, components of an apparatus-connecting device, a pulling jaw, one or several ballast weights, parts of the enclosure, or for the receipt or retention of drive elements of a power take-off shaft, and the like. The front axle bearing block includes several components including a main component which can be utilized with various types of motor vehicles, serves to journal the pendulum axle, and several carrying elements can be secured on the main component for receiving additional devices or machinery to be employed with the vehicle.

11 Claims, 7 Drawing Figures

FRONT AXLE BEARING BLOCK

This application is a continuation of application Ser. No. 54,701 filed July 5, 1979, now abandoned.

The present invention relates to a front axle bearing block for the forward, jointed cross-shaft axle, or "pendulum axle", of a motor vehicle, which can be used in agriculture and/or the construction industry, which bearing block is mountable on the frame of the vehicle, or in the case of a self-supporting construction of the vehicle body, is mountable on the internal combustion engine. The bearing block can serve as the support element or carrying element for additional devices or machinery, such as, for example, components of an apparatus-connecting device, a pulling jaw, one or several ballast weights, parts of the enclosure, or for the receipt or retention of drive elements of a power take-off shaft, and the like.

Depending on the type of use, motor vehicles of the aforementioned type, for example, agricultural tractors, are provided with standard two-wheel or all-wheel drives. Furthermore, tractors intended to be used in agriculture are increasingly provided with front end or forward power lifts and with a front end power takeoff shaft. However, predominantly the agricultural tractors are not equipped with such devices and are normally of the two-wheel drive type. The various kinds of drives of tractors and the other aforementioned devices, however, require, respectively, particular embodiments of the front axle bearing block of very involved designs in order to provide on the front axle bearing block the forward power lift and the power take-off shaft, or, respectively, in the case of an all-wheel drive vehicle, the differential gearing.

It is an object of the invention to provide a front axle bearing block which is of a relatively simple construction with respect to the selection of the auxiliary devices to be installed and, with respect to the selected type of drive, is of a multi-functional nature.

This object and other objects and advantages of the invention will appear more clearly from the following specification in connection with the accompanying drawings, in which.

Figure 1:
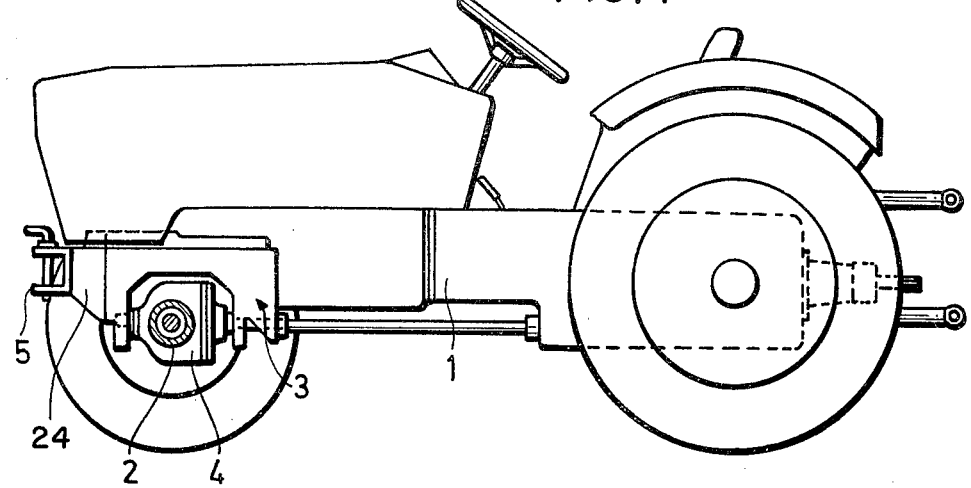
FIG. 1 is a side elevational view of a tractor including the front axle bearing block in accordance with one embodiment of the invention.

The front axle bearing block is characterized primarily thereby that it is comprised of several components and includes a main component which can be utilized with various types of motor vehicles of the aforementioned types. The main component serves to journal the pendulum axle. Furthermore, several carrying elements to be secured on the main component of the front axle bearing block are provided for add-on type or installation type assembly of the additional devices or machinery to be employed with the pertaining motor vehicle.

A front axle bearing block provided in this manner has the essential advantage that the main component thereof, for example, can be used for all tractor types of a series, whereby only the pertaining required components, in the form of replaceable components, of the front axle bearing block need to be added on. Thereby, also a subsequent modification of a tractor will be possible in a simple manner due to the easily exchanged individual carrying elements.

According to a further embodiment of the invention forwardly at the main component, formed as a hollow body, of the front axle bearing block there can be provided one of at least two selectable and interchangeable carrying elements, and/or an intermediate member for upwardly varying the construction height of the bearing block. For this purpose it is preferred that the main component of the front axle bearing block, as well as the intermediate member and the replaceable or interchangeable carrying elements are of box-like structure.

In order to facilitate the handling of the individual components during assembly, preferably at the main component of the front axle bearing block, as well as at the interchangeable carrying elements there is arranged upwardly on both sides a vertical cross piece and at the carrying elements at least forwardly a vertical cross piece extending transversely to the longitudinal central axis of the vehicle, which engage in the intermediate member. Thereby, the intermediate member, preferably, is formed as a carrying element for the front, or forward, frame carrying the enclosure parts of the internal combustion engine, and/or for the battery of the electrical installation. The intermediate member can also be a box-like structure providing a closed hollow space for retention of a fluid medium.

In order to effect a rapid assembly of the front axle, rearwardly and forwardly at the main component of the front axle bearing block there are provided split bearings for receiving the pendulum pin or pivot-stud of the front axle, or, respectively, the swivel bearing of a differential gearing.

At one of the forward interchangeable carrying elements, preferably, bearing blocks for the direct or indirect coupling or connecting of sub link means of an add-on device means are provided. For this purpose, it is advantageous when at one of the interchangeable carrying elements also bearing blocks for operatively connecting one or several lift cylinder piston means of the add-on device arrangement are provided.

When employing a front power take-off shaft, the transmission thereof is arranged within the box-like carrying element, and the slipping clutch is also arranged within the main component of the front axle bearing block.

One of the forwardly arranged interchangeable carrying elements is further provided for the add-on assembly of a pulling claw or jaw, and/or a holder for the mounting or positioning of ballast weights.

Figure 2:
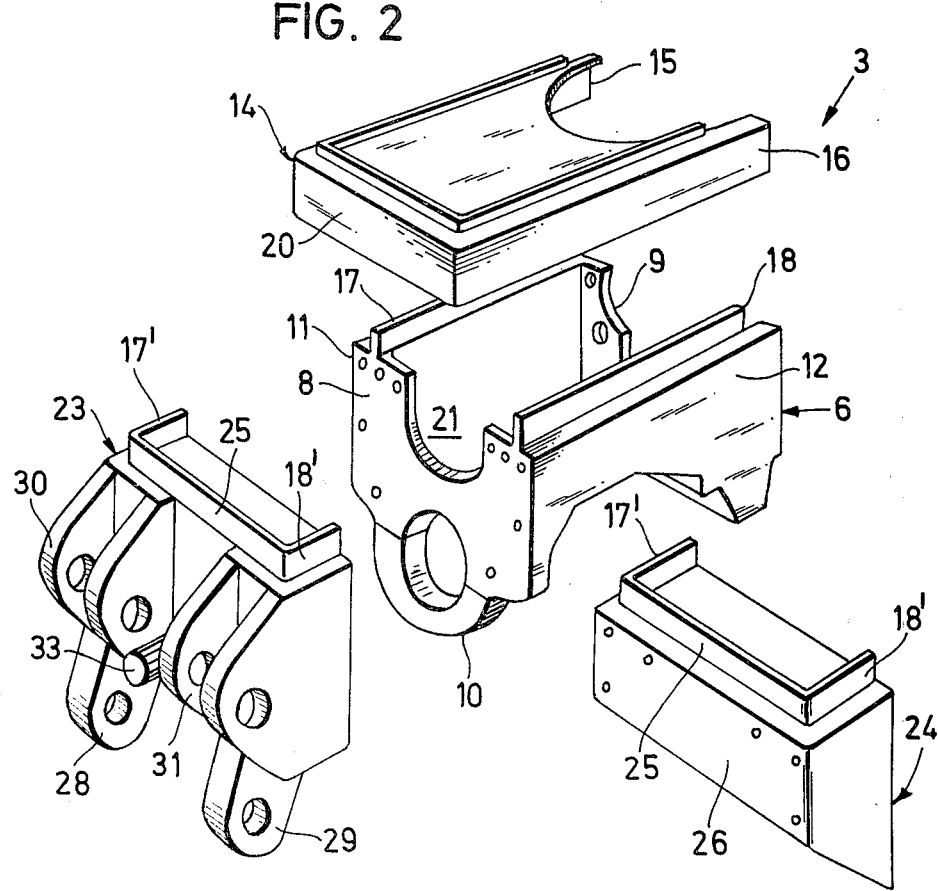
FIG. 2 is an exploded perspective view showing the individual components of a front axle bearing block according to the invention.

Referring now particularly to the drawings, a tractor according to FIG. 1 has a self-supporting body 1 which, for the mounting of a powered front end pendulum axle 2, includes a front axle bearing block 3. At the front axle bearing block 3 there is provided, so as to be pivotal or swingable, a differential transmission 4 for the pendulum axle 2. There is also provided forwardly of the tractor, a coupling jaw or connecting jaw 5. As can be seen more clearly with reference to FIG. 2, the front axle bearing block 3 is composed of a main component 10 and of a plurality of interchangeable carrying elements. The main component member of the front axle bearing block 3 is generally designated by numeral 6, this main component 6 being generally box-like so that it can basically be used as a universal component in all types of tractors of a series. The main component 6 of the front axle bearing block 3 is thus provided so that it can serve for the mounting of a driven or a non-driven pendulum axle or trunnion. For mounting of the two pendulum bearings of a non-powered or non-driven pendulum axle or, respectively, for journalling the differential transmission of a non-powered pendulum axle, there is provided at the main component 6 at the forward wall 8 and at the rearward wall 9 at the lowermost extension thereof a split bearing 10. In a vehicle with a self-supporting type of body, the main component 6 of the front axle bearing block 3 is secured with the rearward wall 9 directly on the housing of the internal combustion engine, not shown in detail. For a vehicle of the frame construction type, also other securement possibilities are available, for example, a securement of the frame components on both side walls 11 and 12 of the main component 6. For upwardly attachment to the main component 6 there is provided an intermediate member 14, also of a generally box-like structure. The intermediate member 14 is positioned to rest on the main component 6 during assembly and is secured by means not shown in detail. It engages with its two lateral side walls 15 and 16 the cross pieces 17 and 18 provided on top of the main component 6 and extending in the longitudinal direction thereof. The intermediate member 14 is provided as an equalizing element which has the purpose to provide, for various types of tractors of the same series and with drive machinery which is of varying size, the opportunity of utilization of the same, equal or identical cover or enclosure parts of the internal combustion engine and/or for the battery of the electrical installation. The intermediate member 14 can also serve as the carrying member for a front frame, not shown, for enclosure of the drive machine. Furthermore, also the intermediate member 14 can receive mountings for securing the battery of the vehicle or for securing of an intermediate partition. There also exists the possibility, however, that the intermediate member 14 is formed to provide a fully enclosed receiving chamber for a fluid medium, with suitable communication means being provided therefrom and thereto, as required.

A semicircular or arcuately shaped aperture 21 is provided in the forward wall 8 of the main component 6, which aperture 21 serves for passage therethrough of the drive shaft of a front power takeoff shaft, both not shown.

Figure 7:
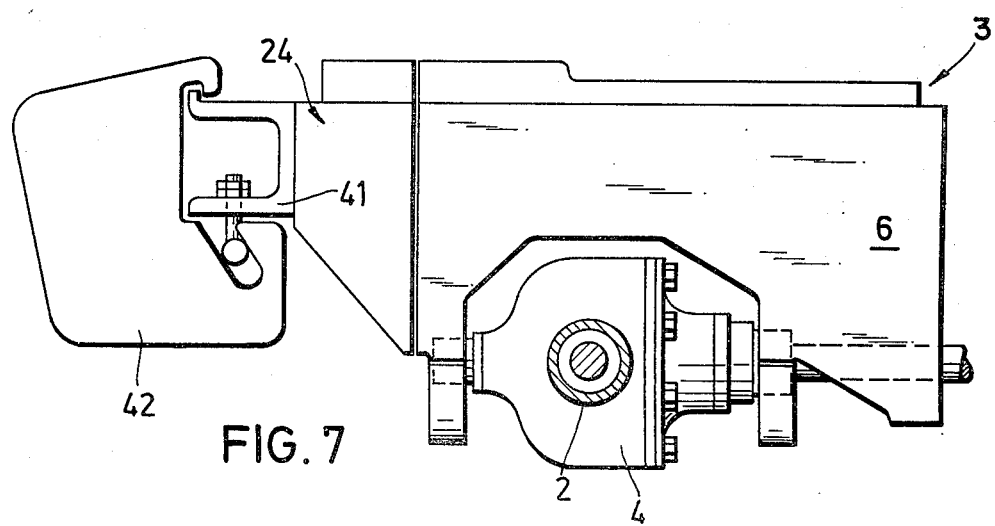
FIG. 7 shows a front axle bearing block with differential gearing for front drive as well as a holder for ballast weights arranged on the support element.

To the forward wall 8 of the main component, selectively, a carrying element, such as designated by the numeral 23, or a carrying element, designated by the numeral 24, can be secured, for example, by suitable screws. Both carrying elements 23 and 24 are box-like in structure and have upper cross pieces 17' and 18' which, on installation of the selected carrying element, are positioned to border at the crosspieces 17 and 18 of the main component 6. The crosspieces 17' and 18' are forwardly connected to each other by a transverse crosspiece 25. The installed intermediate member 14, of course, also operatively engages, by being positioned with its walls 15, 16, and 20 adjacent thereat, the crosspieces 17', 18', and 25 of a pertaining carrying element 23 or 24. The carrying element 24 is formed at its forward wall 26 in a manner that, for example, a pulling or coupling jaw or claw 5, according to FIG. 1, or a carrier for securing the ballast weights according to FIG. 7, generally indicated by the numeral 42, can be arranged thereon. The carrying element 23 is provided for mounting a forward add-on device and therefore is furnished with two lower bearing blocks 28 and 29 for the provision of a pivot point for the sub-guide rods 32'. Two carrying brackets 30 and 31 arranged thereabove serve for provision of a pivot for two lift cylinder/piston units 32. Furthermore, at this carrying element 23 there can also be provided a bearing for an upper pivot pin. In addition to the aforementioned components, in the carrying element 23 there is also journalled a forward or front power take-off shaft 33.

Figure 3:
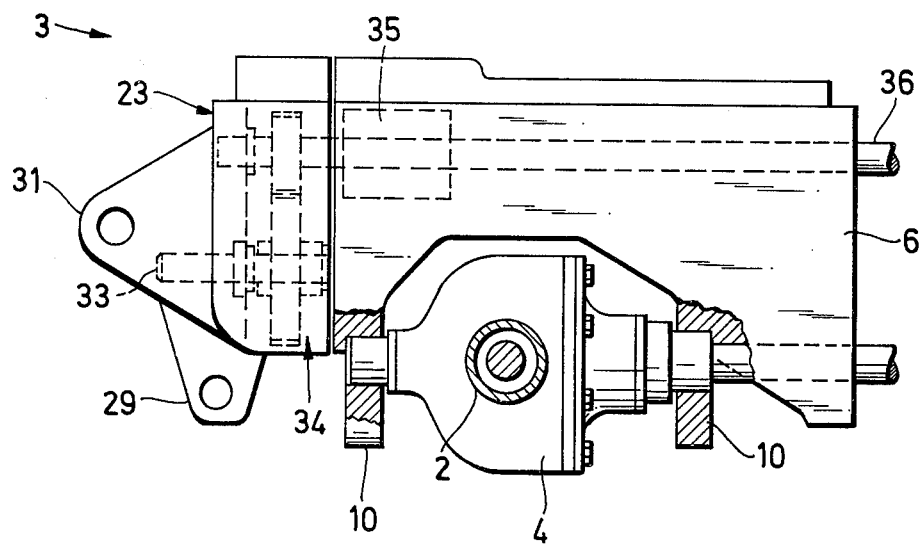
FIG. 3 is a side elevational view of the front axle bearing block for an all-wheel drive tractor with front end power take-off shaft and connections for an apparatus-connecting device.
Figure 4:
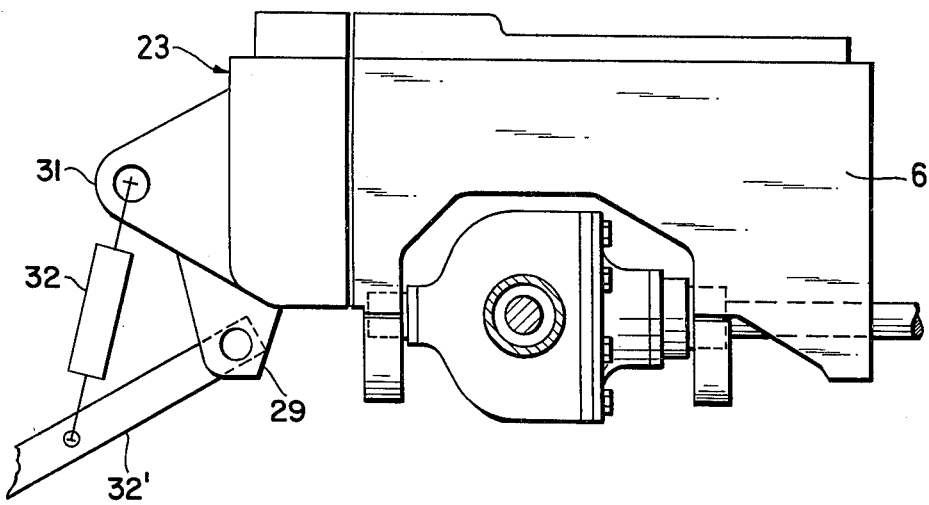
FIG. 4 shows a front axle bearing block similar to the differential gearing of FIG. 3 though without a power take-off shaft.

FIG. 3 shows a modified embodiment according to the invention, in which the main component 6 is provided forwardly with the carrying element 23. The carrying element 23 has means for pivotally mounting a forward add-on device and for journalling a front-end power take-off shaft 33. A speed-reducer drive 34 of the take-off shaft 33 is arranged within the carrying element 23, while coupling 35 is provided within the main component 6 of the front axle bearing block 3. A shaft 36 which drives the take-off shaft 33 is provided for the direct connection to the crank shaft of the internal combustion engine, both not shown. The front axle bearing blocks according to FIGS. 3–7, are for simplicity's sake represented without the intermediate member 14 according to FIG. 2. The front axle bearing block 3 according to FIG. 4, below the main component 6, is provided also with the carrying element 23 for pivotal or swinging mounting of an add-on device. No take-off shaft is provided for this embodiment of the front axle bearing block 3.

Figure 5:
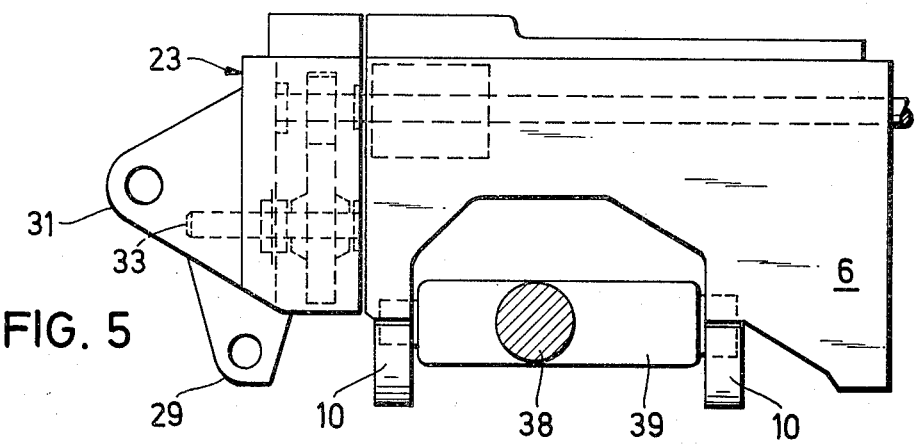
FIG. 5 shows a front axle bearing block with axle bearings for a non-driven front axle with a power take-off shaft and connections for an apparatus to add or construct devices therewith.

According to the embodiment of the front axle bearing block 3 shown in FIG. 5, aside from the main component 6, also the carrying element 23 is employed, and also a forward take-off shaft 33 is provided. This embodiment corresponds generally to that of FIG. 3, but includes a non-driven steering axle 38 which, in place of the differential transmission 4, engages with its pendulum pin 39 in the bearing 10 of the main component 6.

Figure 6:
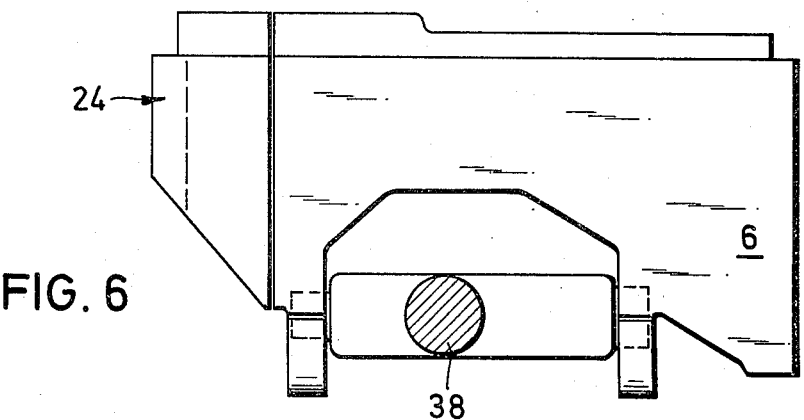
FIG. 6 shows a front axle bearing block for a non-driven front axle without a power take-off shaft and without connections for an apparatus to add devices therewith.

According to the embodiment of FIG. 6, at the main component 6 of the front axle bearing block there is forwardly secured a carrying element 24. Again, as in the embodiment according to FIG. 5, only the bearing or journal for the pendulum pin of a nondriven steering axle 38 is provided.

Finally, in the embodiment according to FIG. 6, a front axle bearing block assembled of components 6 and 24 is shown, in which a driven steering axle 2 is journalled by means of the differential transmission 4. Forwardly at the carrying element 24 there is positioned a U-shaped holder 41 for mounting disc-like ballast weights 42. The holder 41, at corresponding mounting of the ballast weights 42 on both sides of a coupling pin, not shown, arranged centrally in the holder 41, can also be employed as a coupling jaw or hitch.

The invention is, of course, not to be limited to the embodiment shown, since other combinations are available. It is essential that in each combination the main component 6 is employed with the other elements being added as required. The other carrying elements, of course, can be of other configuration when this proves useful.

Thus, the present invention is in no way restricted to the specific disclosure of the specification and drawings, but also encompasses any modifications within the scope of the appended claims.

What I claim is:

1. A multi-part front axle bearing block assembly for supporting a pendulum-type front axle mounted via a transverse trunnion, said block being used interchangeable with self-propelled utility vehicles of various sizes and drive configurations, which vehicles selectively mount a plurality of accessories including: pulling hitches, ballast weights and power take-offs; the front axle bearing block assembly including:

a universally used main component having a front end with a bearing therein for receiving the transverse trunnion, a top surface and a pair of spaced side walls through which the axle passes;

means mountable on the front end of the main component for mounting the accessories;

a height equalizing intermediate member positionable on the top surface of the main component for receiving the engine enclosure thereupon and for determining the height of the engine enclosure with respect to the top of the main component whereby engine enclosures of various sizes may be used in combination with a single universal main component configuration, and two carrying elements interchangeable with one another and attachable to the front end of the main component beneath the intermediate member.

2. The multi-part, front axle bearing block assembly of claim 1 wherein said intermediate member serves as a battery support and frame support.

3. The multi-part front axle bearing block assembly of claim 1 wherein the bearing is split for rapid front axle assembly.

4. A multi-part, front axle bearing block assembly according to claim 1 wherein said main component member, said two carrying elements, and said intermediate member are substantially block-shaped.

5. A multi-part, front axle bearing block assembly according to claim 1 wherein each of said main component and two carrying elements include two spaced apart, substantially parallel, first vertical cross pieces provided at the top thereof which pieces extend longitudinally with respect to the vehicle; each of two said carrying elements further including a second vertical cross piece connecting the first vertical cross pieces and extending transversly with respect to the first vertical cross pieces, said first and said second vertical cross pieces being inserted into said intermediate member.

6. A multi-part front axle bearing block assembly according to claim 1 wherein said intermediate member includes a hollow structure adapted to accommodate a fluid medium.

7. A multi-part front axle bearing block assembly according to claim 1 wherein at least one of two said two carrying elements includes bearing block means for connecting link means of said accessories.

8. A multi-part front axle bearing block assembly according to claim 1 wherein at least one of two said two carrying elements includes bearing block means for operatively connecting at least one lift cylinder piston means of an accessory.

9. A multi-part front axle bearing block assembly according to claim 1 wherein at least one of two said carrying elements includes a power take-off shaft with the transmission thereof being operatively retained in the attached carrying element.

10. A multi-part front axle bearing block assembly according to claim 1 wherein said main component member includes a slip clutch supported therein for operative connection to a power take-off when a power take-off is attached to the main component.

11. A multi-part front axle bearing block assembly according to claim 1 wherein at least one of two said carrying elements includes means for selectively installing a hitch and a holder for supporting ballast weights.

* * * * *

UNITED STATES PATENT AND TRADEMARK OFFICE
CERTIFICATE OF CORRECTION

PATENT NO. : 4403671
DATED : 13 September 1983
INVENTOR(S) : Theo Schmahl

It is certified that error appears in the above—identified patent and that said Letters Patent is hereby corrected as shown below:

On the title-abstract page, at [30] Foreign Application priority data, please change "Jul. 5, 1982" to read:
-- Jul. 5, 1978 --.

Signed and Sealed this

Twenty-ninth Day of November 1983

[SEAL]

Attest:

GERALD J. MOSSINGHOFF

Attesting Officer    Commissioner of Patents and Trademarks